US009489681B2

(12) United States Patent
Barous (10) Patent No.: US 9,489,681 B2
(45) Date of Patent: Nov. 8, 2016

(54) SYSTEMS AND METHODS FOR DISTRIBUTING COUPONS

(76) Inventor: Paul R. Barous, Laguna Niguel, CA (US)

( * ) Notice: Subject to any disclaimer, the term of this patent is extended or adjusted under 35 U.S.C. 154(b) by 97 days.

(21) Appl. No.: 10/397,778

(22) Filed: Mar. 25, 2003

(65) Prior Publication Data

US 2004/0044573 A1     Mar. 4, 2004

Related U.S. Application Data

(60) Provisional application No. 60/406,389, filed on Aug. 27, 2002.

(51) Int. Cl.
*G06Q 30/00*     (2012.01)
*G06Q 30/02*     (2012.01)

(52) U.S. Cl.
CPC .......... *G06Q 30/0239* (2013.01); *G06Q 30/02* (2013.01)

(58) Field of Classification Search
CPC .................................................. G06Q 30/0207
USPC .......................................................... 705/14
See application file for complete search history.

(56) References Cited

U.S. PATENT DOCUMENTS

| 3,804,323 A |   | 4/1974  | Bemel |          |
|-------------|---|---------|-------|----------|
| 4,674,041 A | * | 6/1987  | Lemon et al. | 705/14.35 |
| 4,723,212 A |   | 2/1988  | Mindrum et al. | |
| 4,825,045 A |   | 4/1989  | Humble | |
| 4,833,308 A |   | 5/1989  | Humble | |
| 4,949,256 A |   | 8/1990  | Humble | |
| 5,134,716 A | * | 7/1992  | Craig | 455/66.1 |
| 5,249,044 A |   | 9/1993  | Von Kohorn | |
| 5,537,314 A |   | 7/1996  | Kanter | |
| 5,557,721 A |   | 9/1996  | Fite et al. | |
| 5,612,527 A |   | 3/1997  | Ovadia | |
| 5,612,868 A |   | 3/1997  | Off et al. | |
| 5,620,061 A | * | 4/1997  | Fraser | 186/68 |
| 5,701,694 A |   | 12/1997 | Atkinson | |
| 5,761,601 A | * | 6/1998  | Nemirofsky et al. | 725/34 |
| 5,761,648 A |   | 6/1998  | Golden et al. | |
| 5,794,210 A | * | 8/1998  | Goldhaber et al. | 705/14 |
| 5,845,259 A |   | 12/1998 | West et al. | |
| RE36,116 E  |   | 2/1999  | McCarthy | |
| 5,870,718 A |   | 2/1999  | Spector | |
| 5,923,016 A |   | 7/1999  | Fredregill et al. | |
| 6,052,629 A | * | 4/2000  | Leatherman et al. | 700/241 |
| 6,076,068 A |   | 6/2000  | DeLapa et al. | |

(Continued)

*Primary Examiner* — Matthew L Hamilton
(74) *Attorney, Agent, or Firm* — Coats and Bennett PLLC (57) ABSTRACT

The present invention provides systems and methods for distributing coupons by a retailer. The coupons distributed in the invention are "third-party" coupons, that is, coupons for goods or services that are unrelated to those of the retailer and offered by a third-party retailer. For example, if the coupons are being distributed by a supermarket, then the coupons may be for tools at a home-improvement store or for tax services by an accountant. The distribution methods of the invention increases the revenue of a retailer. More specifically, a consumer is presented a coupon when the value of the transaction exceeds a threshold. In a number of embodiments, the threshold is the average sale per transaction of the retailer. Accordingly, consumers will be motivated to increase spending so that coupons can be earned. The methods and apparatus of the invention are equally applicable to both "brick and mortar" and "click and mortar" retailing. In the latter, consumers may shop on the Internet and print out coupons during checkout if the threshold for a particular website is met.

39 Claims, 6 Drawing Sheets

(56) References Cited

U.S. PATENT DOCUMENTS

| | | |
|---|---|---|
| 6,266,648 B1 | 7/2001 | Baker, III |
| 6,321,208 B1 * | 11/2001 | Barnett et al. .................. 705/14 |
| 6,321,210 B1 | 11/2001 | O'Brien et al. |
| 6,321,984 B1 * | 11/2001 | McCall et al. ................. 235/381 |
| 6,332,128 B1 * | 12/2001 | Nicholson ....................... 705/14 |
| 6,370,514 B1 | 4/2002 | Messner |
| 6,415,262 B1 | 7/2002 | Walker et al. |
| 6,456,981 B1 * | 9/2002 | Dejaeger et al. .......... 705/14.38 |
| 6,516,302 B1 * | 2/2003 | Deaton et al. .................. 705/14 |
| 6,741,968 B2 * | 5/2004 | Jacoves et al. ................. 705/14 |
| 6,778,967 B1 * | 8/2004 | Nicholson ....................... 705/14 |
| 6,813,609 B2 * | 11/2004 | Wilson ............................ 705/14 |
| 7,343,319 B1 * | 3/2008 | Walker et al. .................. 705/21 |
| 2001/0011818 A1 | 8/2001 | Dockery et al. |
| 2001/0027403 A1 | 10/2001 | Peterson et al. |
| 2002/0010627 A1 | 1/2002 | Lerat |
| 2002/0019885 A1 * | 2/2002 | Sleeper ........................ 709/318 |
| 2002/0199188 A1 * | 12/2002 | Sie et al. ........................ 725/35 |
| 2005/0015299 A1 * | 1/2005 | Sisserian ........................ 705/14 |
| 2006/0095328 A1 * | 5/2006 | Ross et al. ...................... 705/14 |
| 2008/0126208 A1 * | 5/2008 | Nicholson et al. ............. 705/14 |

\* cited by examiner

SYSTEMS AND METHODS FOR DISTRIBUTING COUPONS

CROSS REFERENCE TO RELATED APPLICATION

The present application claims priority on U.S. Provisional Application for Patent Ser. No. 60/406,389 filed Aug. 27, 2002, the entire disclosure of which is incorporated herein by reference.

BACKGROUND OF THE INVENTION

The invention relates to methods for operating a register at a retail stores and to methods for enhancing revenue at retail stores. The invention also relates to devices, systems, and software for implementing the methodology of the invention.

Coupons are conventionally distributed in print media, over the Internet, or at a retail store (either on display or printed on the back of receipts). Conventional coupons are for fixed amounts and are distributed regardless of an individual sale. In addition, a number of retail stores may offer discounts based on the total sales price of a transaction. For example, a store may state, "Receive $5 off on purchases of $40 or more." This conventional coupon system has been in place for years and has remained relatively static.

In view of the foregoing, there remains a need in the retail industry for a coupon system that motivates consumers to increase the amount of an individual transaction and, therefore, to increase revenues of participating retailers.

SUMMARY OF THE INVENTION

The present invention provides systems and methods for distributing coupons by a retailer. The coupons distributed in the invention are "third-party" coupons, that is, coupons for goods or services that are unrelated to those of the retailer and offered by a third-party retailer. For example, if a supermarket is distributing the coupons, then the coupons may be for tools at a home-improvement store or for tax services by an accountant.

The distribution methods of the invention increase the revenue of a retailer. More specifically, a consumer is presented a coupon when the value of the transaction exceeds a threshold. In a number of embodiments, the threshold is the average sale per transaction of the retailer. Accordingly, consumers will be motivated to increase spending so that coupons can be earned. The revenue of a retailer may be further enhanced by selling advertising space within the retailer's establishment to participating third-party retailers.

The methods and apparatus of the invention are equally applicable to both "brick and mortar" and "click and mortar" retailing. In the latter, consumers may shop on the Internet and print out coupons during checkout if the threshold for a particular website is met.

Other features and advantages of the present invention will become apparent to those skilled in the art from a consideration of the following detailed description taken in conjunction with the accompanying drawings.

DETAILED DESCRIPTION OF THE INVENTION

The present invention presents apparatus, systems, devices, methods, and processes for generating and increasing revenue at a retail store. According to a number of embodiments of the invention as exemplified in FIG. 1, a check-out stand 100 of a retail store may include a register 102 with a till 104 and a printer 106 for printing receipts. In addition, a number of embodiments may also include a display 108 and a keypad 110.

Figure 1:
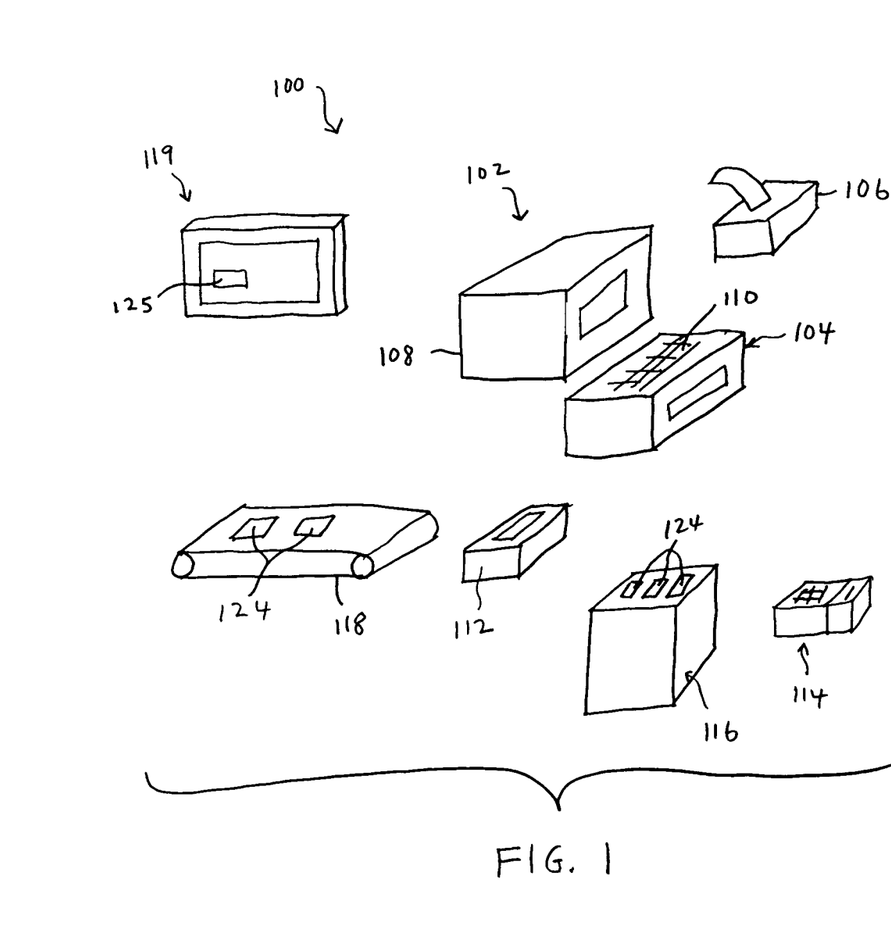
FIG. 1 is a schematic view of a check-out counter.

The check-out stand 100 may also include a scanner 112 for scanning UPC codes and a point-of-sale (POS) device 114 for scanning debit and credit cards. In addition, in a number of embodiments, such as grocery stores, the check-out stand 100 may also include counter space 116 and a conveyor belt 118. The check-out stand 100 may further include a secondary monitor 119 visible to consumers passing through the check-out stand. The secondary monitor 119 may be a touch screen-type monitor so that a consumer may select a coupon as described in more detail below.

Figure 2:
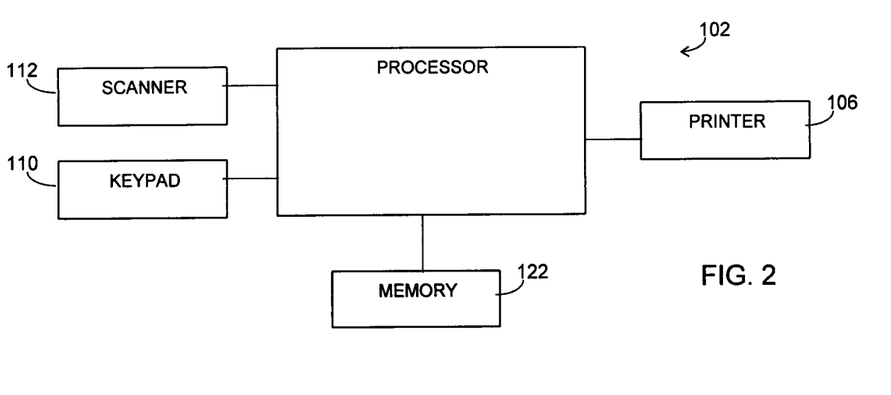
FIG. 2 is a block diagram of a system for printing coupons.

Referencing FIG. 2, in a number of embodiments the register 102 may include a computer with a processor 120 and memory 122. The processor 120 may be in communication with the keypad 110, the scanner 112, and the printer 106.

Figure 3:
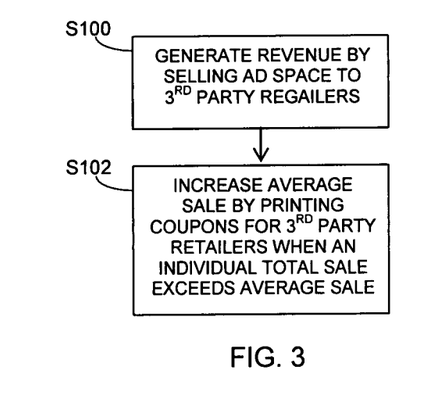
FIG. 3 is a flow chart illustrating revenue-generating methodology.
Figure 4:
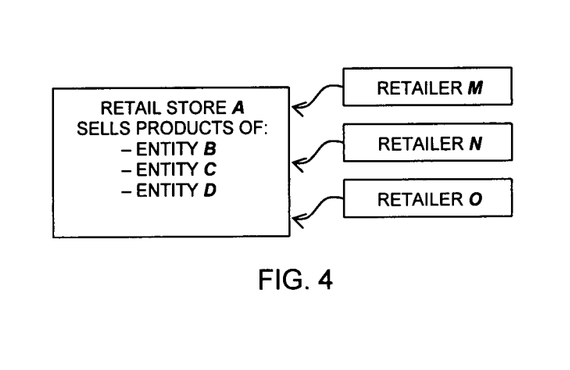
FIG. 4 is a schematic diagram illustrating a relationship between a Retail Store and Participating Retailers.
Figure 5:
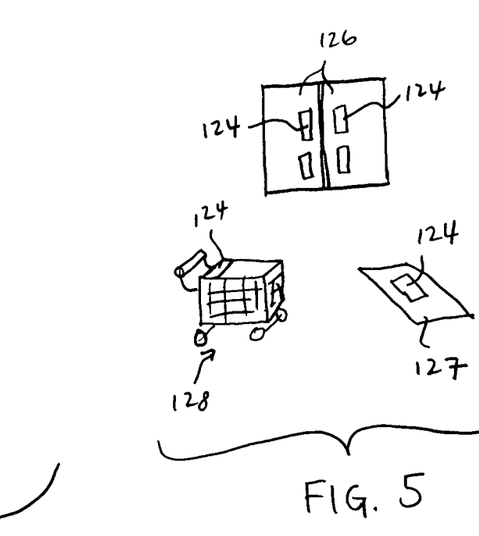
FIG. 5 is a schematic view of advertising space placards.

Referencing FIGS. 3 and 4, a Retail Store A may generate revenue by selling, leasing, or renting advertising space to Participating Retailers M, N, and O (step S100). The advertising space may be in the form of placards 124 located at, for example, the counter space 116 or the conveyor belt 118 at the check-out stand 100. Alternatively, the placards 124 may be located throughout the store, for example, on the doors 126, entry mats 127, or shopping carts 128 as shown in FIG. 5. In other embodiments, the advertising space may be in the form ads 129 shown on the consumer display 119 at the check-out stand 100.

Figure 6:
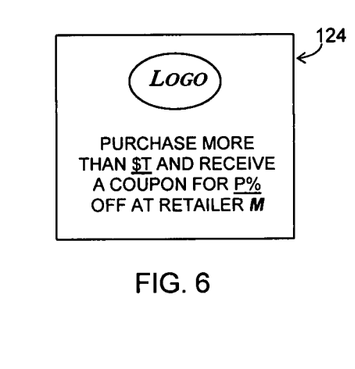
FIG. 6 is a schematic view of a placard.

In a number of embodiments a shown in FIG. 6, a placard 124 or an ad 129 may include a logo of a Participating Retailer and text to the effect, "Purchase more than $(threshold T) at Retail Store A and receive a coupon for (percentage P)% off your next purchase at Participating Retailer M."

According to a number of embodiments, the threshold T may be the average sale per customer of Retail Store A.

According to some of the embodiments, Retail Store A may sell advertising space to more than one Participating Retailer, as shown by way of example of the plurality of placards 124 at the counter 116 in FIG. 1. Each Participating Retailer may have a different threshold T and a different percentage P.

As shown in FIG. 4, Retail Store A sells the products of Entity B, C, and D. According to a number of embodiments, the Retail Store A sells advertising space to Participating Retailers unassociated with the products of the Entities. For example, if Retail Store A is a supermarket selling milk, bread, and fruit (i.e., goods of Entities B, C, and D), then Retail Store A may sell advertising space to retailers of automotive parts, clothing, and dental services (i.e., goods and services of Participating Retailers M, N, and O).

Once advertising space is sold to a Participating Retailer, then the Retail Store A may increase the average sale of Retail Store A by printing coupons for one or more Participating Retailers when an individual total sale exceeds a minimum purchase requirement or threshold T, for example, the average sale (step S102). Shoppers at Retail Store A may be motivated to purchase more goods and/or services of Retail Store A so that their individual total sale exceeds the threshold T in order to receive discounts at the Participating Retailers. Accordingly, the average sale of Retail Store A will be increased.

Figures 7, 9, 10:
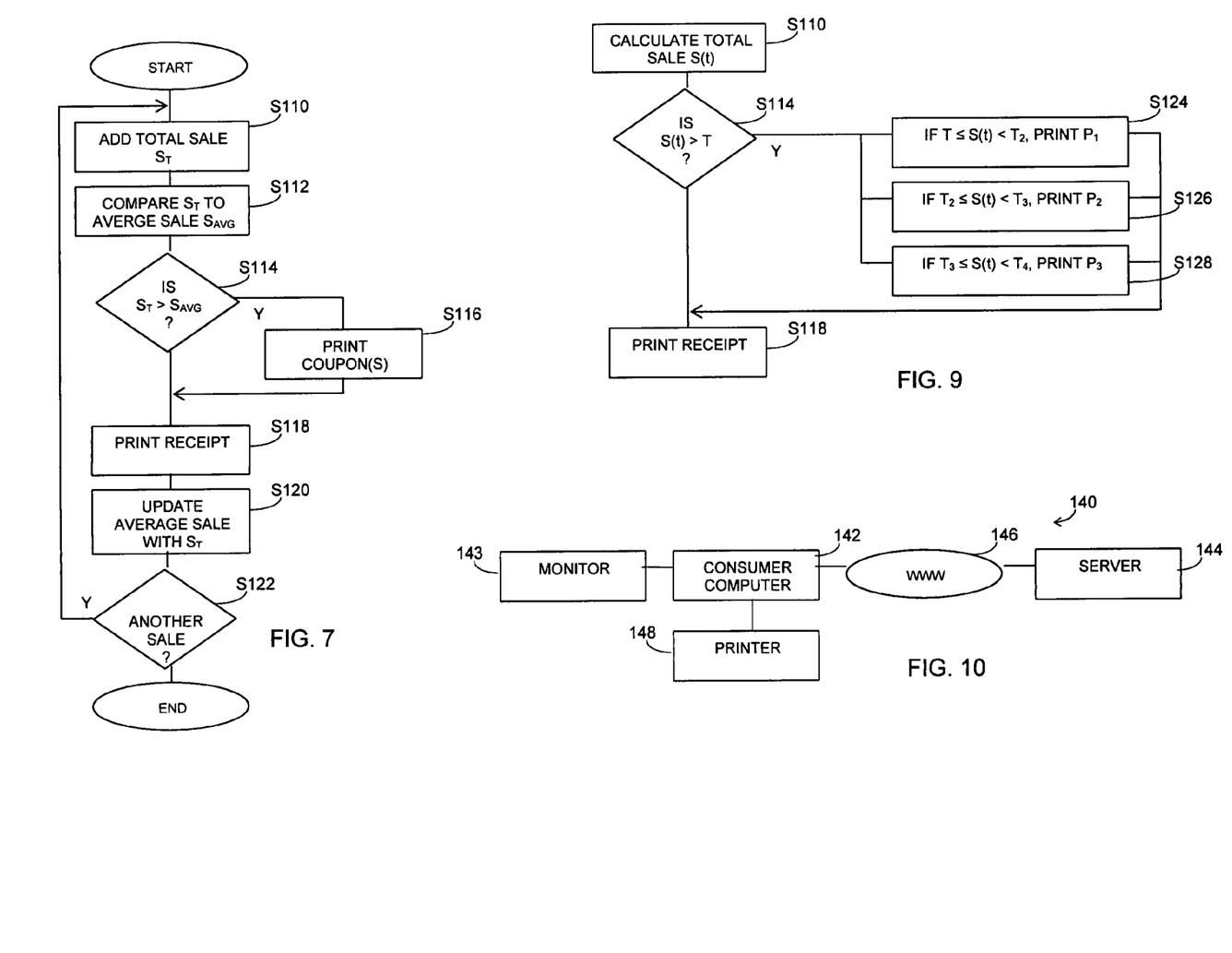
FIG. 7 is a flow chart illustrating methodology of the invention.
FIG. 9 is a flow chart illustrating alternative methodology of the invention.
FIG. 10 is a schematic view of a Internet-based coupon issuing system.

According to a number of embodiments as illustrated in FIG. 7, during an individual sale of a shopper at a check-out stand 100 of Retail Store A, the processor 120 adds the price of each item purchased by the shopper to reach a total sale S(t) (step S110). The prices may be input through the scanner 112 or the keypad 110. The processor 120 may then compare the individual total sale S(t) to a threshold T, for example, the average individual sale S(avg) of the Retail Store (step S112). If the total sale S(t) is greater than the average sale S(avg) (step S114), then the processor 120 may cause the printer 106 to print a coupon for one or more of the Participating Retailers (step S116). If the total sale S(t) is not greater than the average sale S(avg), then the processor 120 may cause the printer 106 to print a receipt for the individual sale (step S118). The average sale S(avg) may be stored in the memory 122.

In some of the embodiments, if the total sale S(t) is not greater than the average sale S(avg), the processor 120 may cause the printer 106 to print a message on the receipt indicating that if the shopper had spent $(difference D) more, then a coupon would have been printed, where the difference D is between the average sale S(avg) and the total sale S(t) for the individual.

According to a number of embodiments, the processor 120 may be configured to maintain a current average sale S(avg). That is, the processor 120 may recalculate the average sale S(avg) after each purchase with the current individual total sale S(t) (step S120). In retail stores with a plurality of check-out stands 100, a centralized computer may be used to maintain the current average sale of all of the check-out stands. The process continues for the next individual sale (step S122). The current average sale S(avg) may be displayed in the store, such as on the secondary monitor 119 (see FIG. 1) or on a central display in the store (not shown).

Figure 8:
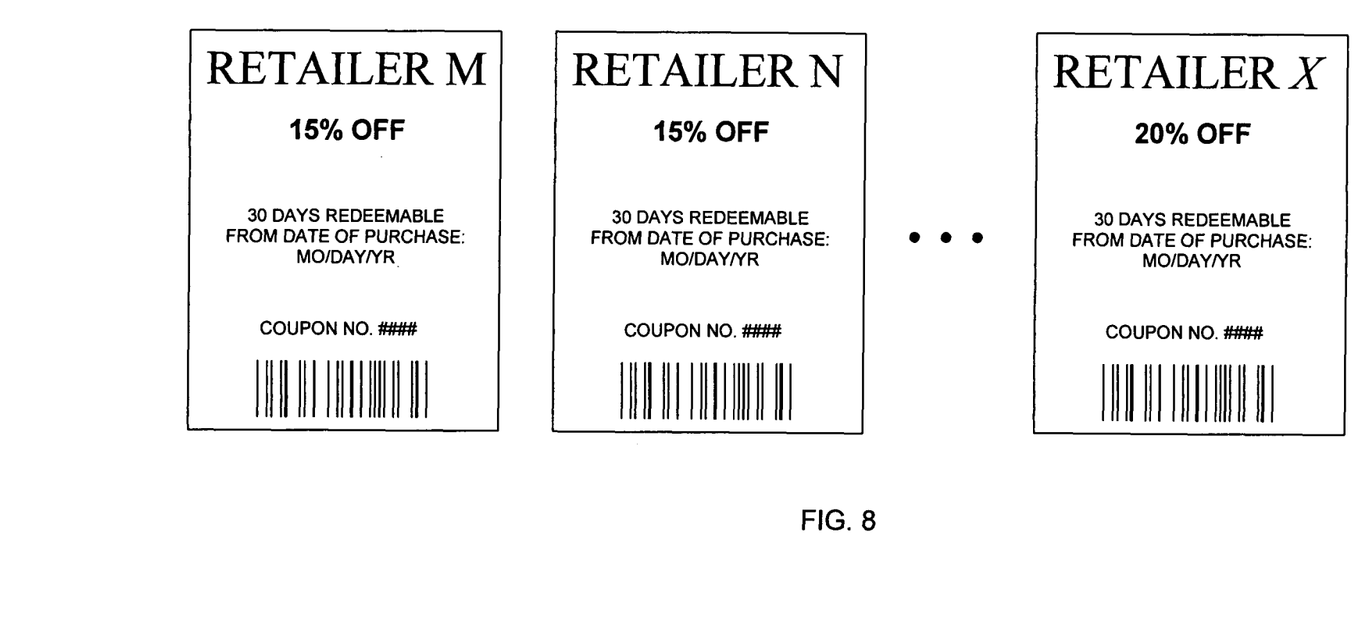
FIG. 8 is a schematic view of coupons.

An example of a coupon 130 that may be printed when the total individual sale S(t) exceeds a threshold T is illustrated in FIG. 8. The coupon 130 may include the name of the Participating Retailer, the percentage of the discount, an expiration date, a coupon number, a barcode, etc. As mentioned, coupons 130 for each of the Participating Retailers may be printed when the threshold T is exceeded.

According to some of the embodiments, the printed coupons 130 may be individually printed and presented to the shopper at Retail Store A or may be printed on the receipt (either the front or the back of the receipt) at step S118. In addition, if more than one coupon 130 is printed, there may be perforations between the coupons to facilitate separation by a user.

More than one printer may be used to perform the printing of the coupons 130. For example, in a number of embodiments, the check-out stand 100 may include a dedicated printer 132 for printing the coupons 130, while the other printer 106 prints the receipt.

According to some of the embodiments, the display 108 at the check-out stand 100 may display a running total T(r) of the individual sale so that a shopper is informed of whether or not the threshold T is likely to be met by the individual sale. If, for example, the running total T(r) is short of the threshold T by a small amount, then the shopper will be motivated to make an impulse purchase of goods located at the check-out stand 100 to push the running total T(r) [and, therefore, the total sale S(t)] over the threshold T.

According to other embodiments of the invention as illustrated in FIG. 9, the processor 120 may be configured to increase the percentage P as a function of the total sale S(t). For example, if the threshold T is exceeded by the total sale S(t), then a coupon 130 for one or more Participating Retailers may be printed. The percentage P of the discount of the coupon 130 may be a function of the amount of the total sale S(t) over the threshold T.

More specifically, if the total sale S(t) is greater than or equal to the threshold T but less than a first limit T(1), then the processor 120 may cause the printer 106 to print a first percentage P(1) (e.g., 10%) on the coupon 130 (step S124). If the total sale S(t) is greater than or equal the first limit T(1) but less than a second limit T(2), then the processor 120 may cause the printer 106 to print a second percentage P(2) (e.g., 15%) on the coupon 130 (step S126). If the total sale S(t) is greater than or equal the second limit T(2) but less than a third limit T(3), then the processor 120 may cause the printer 106 to print a third percentage P(3) (e.g., 20%) on the coupon 130 (step S128).

The limits T may be fixed or may be recalculated for each individual sale based on the current average sale S(avg). In addition, the limits T may be a fixed amount greater than the threshold T or may be percentage of the current average sale S(avg), e.g., 110% of S(avg), 120% of S(avg), etc.

In other embodiments, the system 100 may enable a user to select the coupon. More specifically, if the threshold T is exceeded, a plurality of coupons may be displayed on the second monitor 119 (see FIG. 1). The user may then selected which of the coupons is to be printed. The selection may be verbally or through the use of a touch screen, for example.

In addition to the "brick and mortar" retail example provided above, the principles of the present invention are analogously applicable to Internet commerce as well. More specifically, as shown in FIG. 10, a network 140 including a consumer computer 142 with a monitor 143 connected to a seller server 144 via the world-wide web 146 enables consumers to receive coupons on their own printer 148 according to the invention.

Figure 11:
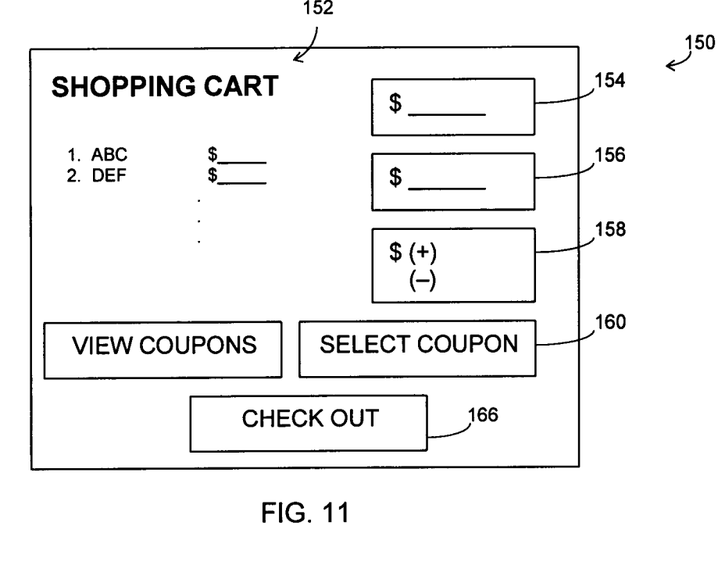
FIG. 11 is a schematic view of a graphical user interface for use in an Internet-based coupon system.

Referencing FIG. 11, an example of a graphical user interface (GUI) 150 for display on the monitor 143 of the consumer computer 142 in accordance with the principles of the invention is illustrated. The GUI 150 may include a shopping cart 152 such as item information and unit price. Additionally, the GUI 150 may include a threshold field 154, a subtotal field 156, and a difference field 158.

Figure 12:
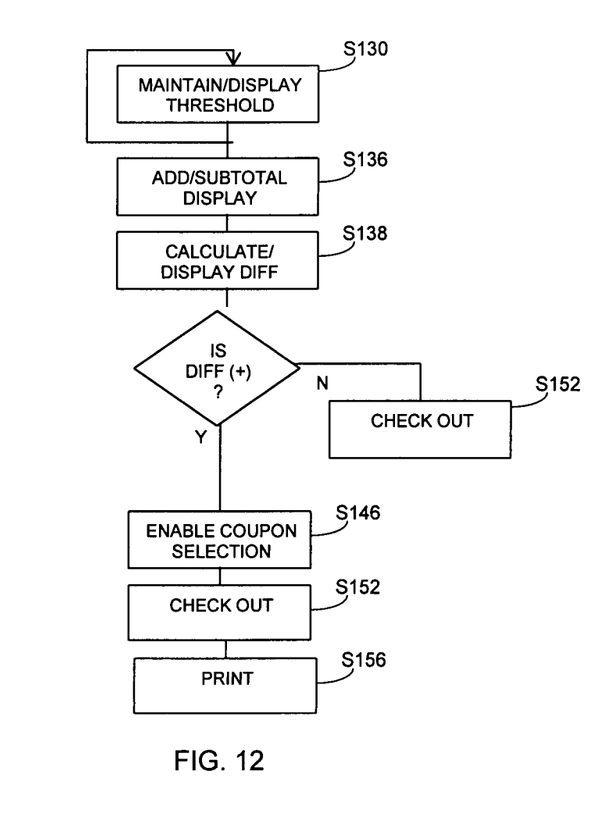
FIG. 12 is a flow chart illustrating server methodology of issuing coupons.
Figure 13:
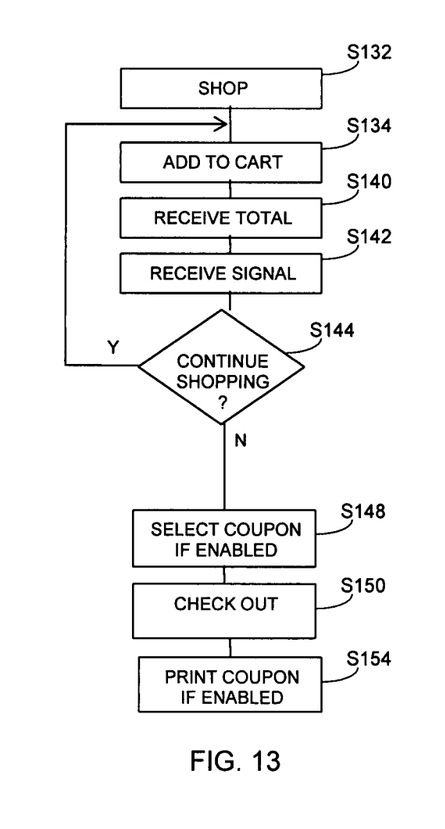
FIG. 13 is a flow chart illustrating consumer methodology for receiving coupons.

With additional reference to FIGS. 12 and 13, the server 144 maintains the threshold T for a particular website and displays the threshold T (S130) in the threshold field 154 of the GUI 150. When shopping (S132), a consumer then adds items from the website to the shopping cart (S134). The server. 144 may then maintain a running subtotal S(sub) and display the subtotal S(sub) (S136) in the subtotal filed 156. In addition, the difference between the threshold T and the subtotal S(sub) may be calculated and displayed (S138) in the difference field 158.

The consumer may then view the subtotal S(sub) (S140) and the difference to determine whether or not the threshold T has been reached. In accordance with this embodiment, a signal that the threshold T has been reached may be in the form of a positive difference, i.e., subtotal S(sub) less threshold T. If the threshold T has not been reached, the consumer may continue shopping (S144) to increase the value of the transaction until the threshold T is met, if desired.

Figure 14:
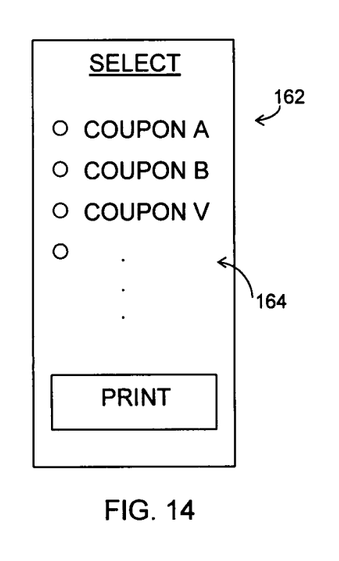
FIG. 14 is a schematic view of a pop-up window for enabling the selection of coupons.

If the subtotal S(sub) is greater than the threshold T (i.e., if the difference is positive), then the server 144 may enable a select coupon icon 160 (S146) in the GUI 150. This may also act as a signal (see step S142). If the select coupon icon 160 is selected (S148), then a pop-up window 162 may be displayed with a plurality of coupon choices 164, one of which the consumer may select, as shown in FIG. 14.

If the consumer does not want to continue shopping, then a checkout icon 166 may be selected (S150), thereby initiating a checkout sequence (S152). Upon checking out, if the threshold T was met, then the consumer may print out the selected coupon (S154), with the coupon being printed (SI 56) at the printer 148.

In the foregoing description, coupon is used to describe a coupon issued by Retailer A for the goods or the services of Retailer B, wherein the goods/services of Retailer B are unrelated to those of Retailer A. Accordingly, for the purposes of this description, these coupons are referred to as third-party coupons.

Those skilled in the art will understand that the preceding exemplary embodiments of the present invention provide the foundation for numerous alternatives and modifications thereto. These and other modifications are also within the scope of the present invention. Accordingly, the present invention is not limited to that precisely as shown and described above but by the scope of the appended claims.

What is claimed is:

1. A system for distributing third-party coupons by a retailer on the Internet, the Internet including a computer with a monitor and a printer, the third-party coupons being associated with goods or services of a third-party retailer, which goods or services are unrelated to the goods or services of the retailer and wherein the third-party retailer purchases advertising from the retailer, the system comprising:
   a server configured to:
   cause a graphical user interface (GUI) to be displayed on the monitor;
   display an advertisement associated with a third-party coupon of the third-party retailer;
   display a threshold value in the GUI;
   calculate a value of a transaction based on a purchase of goods or services made from the retailer by a consumer;
   display the value of the transaction in the GUI; and
   enable the computer to print the third-party coupon when the value of the transaction exceeds the threshold value;
   wherein the third-party coupon is redeemable for the goods or services of the third-party retailer; and
   wherein goods or services of the third-party retailer are unrelated to the goods or services sold by the retailer and therefore are unpurchaseable from the retailer.

2. The system of claim 1 wherein the threshold value is an average sale per transaction of the retailer.

3. The system of claim 1 wherein the server is further configured to:
   calculate a difference between the transaction value and the threshold value; and
   display the difference in the GUI.

4. The system of claim 1 wherein the server enables a third-party coupon to be selected from a plurality of third-party coupons prior to printing.

5. A method implemented by a point-of-sale register having a processor for increasing revenue for a retail outlet by distributing third-party coupons associated with third-party retailers, comprising:
   providing advertising space by the retail outlet for advertising the goods and services of the third-party retailers where the advertised goods and services of the third-party retailers are unrelated to the goods and services sold by the retail outlet;
   advertising the goods and services of the third-party retailers in the advertising space;
   utilizing the point-of-sale register to determine the value of a transaction of goods or services sold to a shopper by the retail outlet;
   utilizing the point-of-sale register to compare the value of the transaction with a threshold value and utilizing the point-of-sale register to determine if the value of the transaction exceeds the threshold value; and
   in response to the value of the transaction exceeding the threshold value, the point-of-sale register causes a third-party coupon associated with the goods or services of a respective third-party retailer to be issued to the shopper where the goods and services of the third-party retailer are unrelated to the goods and services of the retail outlet and are unpurchasable at the retail outlet such that the third-party coupon issued by the retail outlet is unredeemable at the retail outlet.

6. The method of claim 5 wherein the threshold value is a function of sales of the retail outlet.

7. The method of claim 6 wherein the threshold value is a function of the average sale per transaction of the retail outlet.

8. The method of claim 5 wherein the third-party coupon provides a percentage discount at a respective third-party retailer, and wherein the method includes varying the percentage discount of the issued coupon as a function of the value of the transaction.

9. The method of claim 5 wherein the third-party coupon provides a percentage discount at a respective third-party retailer, and wherein the method includes varying the percentage discount of the coupon issued as a function of an amount that the value of the transaction exceeds the threshold value.

10. The method of claim 7 wherein the threshold value is the average sale per transaction of the retail outlet.

11. The method of claim 5 including presenting a plurality of third-party coupons to the shopper associated with the transaction and enabling the shopper to select one or more third-party coupons from the plurality of third-party coupons presented.

12. The method of claim 5 wherein the retail outlet is an Internet retail outlet.

13. The method of claim 5 wherein the point-of-sale register causes one or more of the third-party coupons to be displayed on a monitor positioned such that the shopper associated with the transaction may view the one or more third-party coupons displayed on the monitor.

14. The method of claim 5 wherein in response to the value of the transaction exceeding the threshold value, the point-of-sale register causes a printer to print a third-party coupon which is a discount coupon.

15. The method of claim 5 wherein the threshold value is a function of sales of the retail outlet; and wherein the third-party coupon provides a percentage discount at a respective third-party retailer, and wherein the method includes varying the percentage discount of the issued coupon as a function of the value of the transaction.

16. The method of claim 15 including presenting a plurality of third-party coupons on a display at a checkout station to a shopper associated with the transaction and enabling the shopper to select one or more of the third-party coupons from the plurality of third-party coupons presented on the display.

17. The method of claim 8 wherein the point-of-sale register causes a third-party coupon to be printed with a first percentage discount if the value of the transaction is equal to or greater than a first threshold value, but less than a second threshold value; and wherein the point-of-sale register causes a third-party coupon to be printed with a second percentage discount if the value of the transaction is equal to or greater than the second threshold value, but less than a third threshold value.

18. The method of claim 5 wherein the retail outlet is on the Internet and a shopper having access to a computer, monitor and a printer is enabled to purchase goods or services from the retail outlet on the Internet, the method further comprising:
   causing graphical user interface to be displayed on the monitor accessible to the shopper;
   causing an advertisement associated with a third-party retailer and the third-party coupon to be displayed on the monitor;
   displaying the threshold value on the graphical user interface;
   displaying the value of the transaction of the shopper; and
   enabling the third-party coupon to be printed on the shopper's printer when the value of the transaction of the shopper exceeds the threshold value; and wherein the third-party coupon is redeemable for goods or services at the third-party retailer and wherein the goods or services of the third-party retailer are unrelated to the goods or services sold by the retail outlet on the Internet.

19. The method of claim 18 including calculating a subtotal of the transaction of the shopper, displaying the subtotal on the monitor, and calculating a difference between the subtotal and the threshold value and displaying the difference on the monitor.

20. The method of claim 19 including displaying a plurality of different discount coupons on the monitor and permitting the shopper to select one or more of the display discount coupons in response to the value of the transaction exceeding the threshold value.

21. A checkout system for a retail outlet for distributing third-party discount coupons associated with one or more third-party retailers comprising:
   a printer; and
   a point-of-sale register having a processor configured to:
      add prices of items purchased by a shopper to reach a total sale $S_T$;
      compare the total sale $S_T$ of the shopper to a threshold sale value T; and
      print one or more third-party coupons for use with a respective third-party retailer to purchase goods or services unrelated to the goods or services offered by the retail outlet if the total sale $S_T$ of the shopper exceeds the threshold sale value T.

22. The system of claim 21 wherein advertising space is associated with the checkout system and is configured to display advertisements for the one or more third-party retailers.

23. The system of claim 21 wherein the point-of-sale register is configured to print a receipt for the total sale $S_T$ and to print a message on the receipt indicating that if the shopper had spent a difference D then a coupon would have been printed.

24. The system of claim 21 wherein the discount coupon printed by the printer includes a percentage discount; wherein the point-of-sale register is further configured to vary the percentage discount of the discount coupon printed based on the total sale $S_T$ of the shopper.

25. The system of claim 24 wherein the point-of-sale register is further configured to print a coupon having a first percentage discount if the total sale $S_T$ of the shopper is equal to or greater than a first threshold sale value but less than a second threshold sale value; and configured to print a coupon having a second discount percentage if the total sale $S_T$ of the shopper is equal to or greater than the second threshold sale value but less than an third threshold sale value.

26. The system of claim 21 wherein the checkout system includes at least two displays, one display associated with the point-of-sale register and a second display; and wherein the point-of-sale register is configured to display one or more third-party discount coupons on the second display for selection.

27. The method claim 5 including the retail outlet selling or renting the advertising space to one or more of the third-party retailers.

28. A method implemented by a point-of-sale register having a processor for increasing revenue for a retail outlet by distributing to consumers third-party discount coupons associated with third-party retailers, comprising:
   positioning a consumer display adjacent a checkout station at the retail outlet and making the consumer display visible to consumers passing through the checkout stand;
   displaying third-party advertisements on the consumer display that advertise goods or services of the third-party retailers where the advertised goods or services of the third-party retailers are unrelated to the goods or services of the retail outlet;
   utilizing the point-of-sale register to determine the value of goods or services purchased by a consumer from the retail outlet;
   utilizing the point-of-sale register to compare the value of goods or services purchased by the consumer with a threshold value and utilizing the point-of-sale register to determine if the value of the goods or services purchased by the consumer exceeds the threshold value; and if the value of the goods or services purchased from the retail outlet exceeds the threshold value, the point-of-sale register causes one or more third-party discount coupons to be issued to the consumer and printed by a printer, the one or more third-party discount coupons redeemable to purchase goods or services of the third-party retailer advertised on the consumer display at the checkout stand.

29. The method of claim 28 wherein the third-party advertisements displayed on the consumer display include third-party discount coupons.

30. The method of claim 28 wherein the checkout stand includes two displays, the consumer display and another different and distinct display.

31. The method of claim 29 including displaying a plurality of different third-party discount coupons on the consumer display and enabling the consumer to select one or more of the displayed third-party discount coupons.

32. The method of claim 28 including displaying a running total at the checkout stand of the consumer's purchases and displaying the threshold value such that the consumer is aware of threshold value and the amount of the purchases being made.

33. The method of claim 13 including positioning the monitor at a checkout stand and wherein the monitor for displaying the one or more third-party coupons is separate from a cash register monitor also positioned at the checkout stand, and wherein the monitor displaying the third-party coupons is positioned such that the third-party coupons displayed on the monitor are visible to the shopper at the checkout stand such that the shopper can select one or more of the third-party discount coupons displayed on the monitor if the value of the transaction exceeds the threshold value.

34. The method of claim 5 wherein determining the value of the transaction includes the point-of-sale register adding prices of items purchased by the shopper and determining a total sales prices $S_T$, the point-of-sale register comparing the total sale $S_T$ with the threshold value; and if the total sale $S_T$ exceeds the threshold value, the point-of-sale register causes a printer to print the third-party coupon.

35. The method of claim 34 further including the point-of-sale register determining the threshold value based on sales of the retail outlet.

36. The method of claim 34 further including the point-of-sale register adding sales of the retail outlet and determining the threshold value based on sales of the retail outlet.

37. The method of claim 5 further including the point-of-sale register calculating an average sale based on individual sales by the retail outlet and wherein the threshold value is a function of the calculated average sale.

38. The method of claim 5 including transmitting the threshold value to a monitor and displaying the threshold value on the monitor for viewing by the shopper.

39. The method of claim 5 wherein determining the value of the transaction includes inputting into the point-of-sale register prices of goods or services purchased by the shopper with a scanner or keyboard; the point-of-sale register adding the prices and determining total sale $S_T$ and comparing total sale $S_T$ with the threshold value; and if total sale $S_T$ exceeds the threshold value, the point-of-sale register causes a printer to print a third-party coupon.

\* \* \* \* \*

UNITED STATES PATENT AND TRADEMARK OFFICE
CERTIFICATE OF CORRECTION

PATENT NO.       : 9,489,681 B2                                    Page 1 of 1
APPLICATION NO. : 10/397778
DATED            : November 8, 2016
INVENTOR(S)      : Paul R. Barous It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 565 days.

Signed and Sealed this

Twenty-fifth Day of September, 2018

Andrei Iancu
*Director of the United States Patent and Trademark Office*